United States Patent Office 3,359,672
Patented Dec. 26, 1967

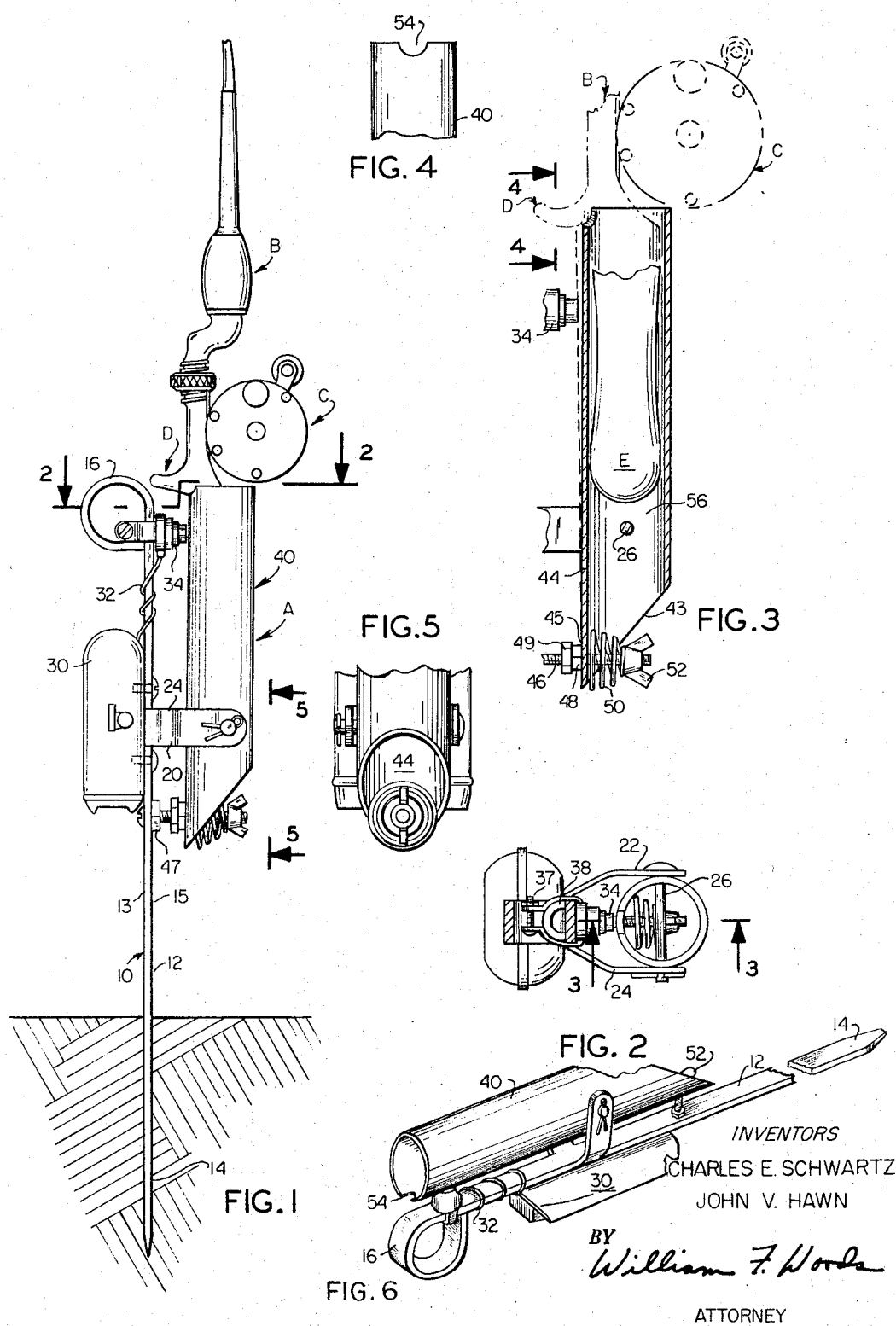

3,359,672
FISHING ROD HOLDER AND BITE SIGNAL
Charles E. Schwartz and John V. Hawn, both of R.F.D. 3,
Mott, N. Dak. 58646
Filed June 4, 1965, Ser. No. 461,273
1 Claim. (Cl. 43—17)

ABSTRACT OF THE DISCLOSURE

A fishing rod holder and bite signal having a ground piercing stake on which is formed a circular enclosed hand hold together with a tubular rod holder pivotally mounted on the stake and audible signal means contactable by the rod holder when the rod is pivoted, the rod holder having a scarfed extension through which a nut-equipped bolt freely extends. The bolt is connected to the sake and has a coil spring mounted on the bolt which normally urges the rod holder from the signal means.

This invention relates to an improved device for fishing; and more particularly, but not necessarily exclusively, to an improved device of this type including means for holding a fishing rod and signalling when a bite occurs.

The general object of the invention is to improve fishing rod rolders and bite signals. Other objects of the invention are: to provide an improved fishing rod holder and bite signal including means for preventing the rod from twisting in the holder; to provide in a fishing rod holder and bite signal improved means for facilitating the hand insertion of the support structure into the ground; to provide a device of this type including novel means for tensioning and adjusting the rod holder with respect to the bite signal to accommodate for varying conditions of wind, fishing circumstances and the like; and, in general, to provide an improved fishing rod holder and bite signal which is highly versatile and dependable in operation, simple and inexpensive to construct, and rugged and long wearing in service.

These and other objects and advantages of the invention will become more fully apparent from a consideration of the following detailed description taken in conjunction with the accompanying drawing wherein a representative embodiment of the invention is shown by way of illustration and not by way of limitation.

In the drawing:

FIG. 1 is a side elevational view of the invention shown mounted in the ground;

FIG. 2 is a view, partially in section, taken on the line 2—2 of FIG. 1;

FIG. 3 is a view, partially in section, taken on the line 3—3 of FIG. 2;

FIG. 4 is a fragmentary view taken on the line 4—4 of FIG. 3;

FIG. 5 is a fragmentary view taken on the line 5—5 of FIG. 1; and

FIG. 6 is a fragmentary perspective view of the invention.

Briefly speaking, our fishing rod holder and bite signal is characterized by an elongated ground stake having an upper hand engageable loop to facilitate its insertion into the ground. A tubular rod holder, pivotally mounted on the ground stake for rocking movement, is equipped with a notched out portion adjacent its end to receive the fishing rod finger grip and prevent the rod from twisting. Further provided are improved means for tensioning and adjusting the angle of the rod. A bite signal device cooperable with the rod holder is also carried by the ground stake.

Referring now to the drawing, the invention, indicated in its entirety by the reference character A, is shown in FIG. 1 as supporting a fishing rod B equipped with a reel C, a finger grip D, and handle E. To support the device A, a ground stake 10 (see FIG. 6) is provided having a flat elongated body 12 and sides 13, 15. Stake 10 terminates at its lower end in a tapered ground piercing point 14 and at its upper end in a hand engaging loop portion 16. A generally U-shaped bracket 20 is secured to the side 15 of stake 10 between its ends. Bracket 20 includes spaced standards 22, 24 through which a pivot pin 26 extends.

A battery operated bicycle horn 30 is secured to side 13 of stake 10 adjacent bracket 20. Leads 32 connect the horn 30 with a push button switch 34 that is mounted on side 15 of stake 10 by means of a yoke member 36 which surrounds stake 10 and extends into the loop portion 16 thereof where it is clamped by means of a bolt 37. A semi-circular support 38 is carried between the yoke 36 and the side 13 of stake 10 within loop 16 to permit the bolt 37 to draw the yoke 36 and push button 34 tightly against stake 10.

Further provided is a tubular rod holder 40 which is pivotally mounted adjacent its lower end between the standards 22, 24 of bracket 20 by means of a pivot pin 26 that passes through aligned holes 42 in the body of holder 40. The lower end of holder 40 is scarfed, as at 43, resulting in an open lower extension 44 which is drilled, as at 45, to permit the shank of a bolt 46 to pass therethrough from its connection with stake 10. The bolt 46 is threaded and equipped with a nut 47 to hold it fast to stake 10. A set nut 48 and lock nut 49 are also provided to permit the angular movement of rod holder 40 about pivot pin 26 to be adjusted. The extension 44 of rod holder 40 is biased into abutting engagement with set nut 48 by means of a compression spring member 50, which surrounds the portion of bolt 46 above extension 44 and which may be axially adjusted by wing nut 52 to increase or decrease the spring pressure exerted against the rod holder 40.

The upper end of rod holder 40 is provided with a semi-circular notch 54 cut into its edge to receive the trigger grip D of fishing rod B. When the rod handle D is inserted into the rod holder 40 its trigger grip is cradled in notch 54 with clearance 56 being provided between the rear end of the handle D and the pivot pin 26, as shown in FIG. 3. This construction keeps the rod from twisting about in holder 40, prevents damage to the end of the rod handle to be supported within the rod holder 40.

In use, the stake 10 is pushed by hand into the ground with the hand hold 16 serving as an extremely efficient grip to exert sufficient force to enable the stake 10 to be firmly implanted. The rod B is inserted into the rod holder 40 so that its trigger grip D engages the notch 54. By turning the wing nut 52, the pressure exerted against extension 44 of holder 40 by spring 50 may be varied to accommodate different wind conditions, stream velocities, or other circumstances. The set nut 48 may be adjusted axially of bolt 46 to vary the angle between the rod holder 40 and stake 10. By adjustment of the set nut 48 and the wing nut 52 a particular fishing condition may be compensated for so that only bona fide bites will result in the operation of the horn 30.

It is believed that the invention, its mode of construction and assembly and operation, as well as its advantages should be readily understood from the foregoing without further description, and it should also be manifest that while a preferred embodiment of the invention, has been shown and described for illustrative purposes, the structural details are nevertheless capable of wide variation within the purview of the invention as defined in the appended claim:

We claim:

In a fishing rod holder and bite signal, the combination of:

an elongated ground piercing stake,
said stake including a circular enclosed hand hold at one end, a tubular rod holder pivotally mounted on said stake intermediate its ends for rocking movement about an axis normal thereto, signal means including a push button carried by said stake and cooperable with said rod holder to produce an audible signal when said rod holder is pivoted about its axis, said rod holder having a notch therein adapted to cradle the trigger grip of a fishing rod, said rod holder having a scarfed lower end thereby forming an extension having outer and inner surfaces, spring means including a bolt member secured to said stake normal thereto and extending through an opening in said extension of said rod holder and normal to said rod holder, means threadedly secured to said bolt and abutting the outer surface of said extension for adjustably limiting pivotal movement of said rod holder in one direction, a compression spring member surrounding said bolt in abutting engagement with the inner surface of said extension for yieldingly limiting pivotal movement of said rod holder in the opposite direction, and a finger engageable nut threadedly secured to the end of said bolt.

References Cited

UNITED STATES PATENTS

| | | | |
|---|---|---|---|
| 2,479,055 | 8/1949 | Baur | 43—21.2 |
| 2,909,860 | 10/1959 | Braun | 43—17 |
| 3,156,997 | 11/1964 | Smith | 43—17 |
| 3,285,360 | 11/1966 | Wetsch | 43—17 |

SAMUEL KOREN, *Primary Examiner.*

WARNER H. CAMP, *Examiner.*